Dec. 14, 1937. D. L. BABCOCK 2,101,830
TILTING MECHANISM FOR PROJECTORS
Filed March 5, 1937
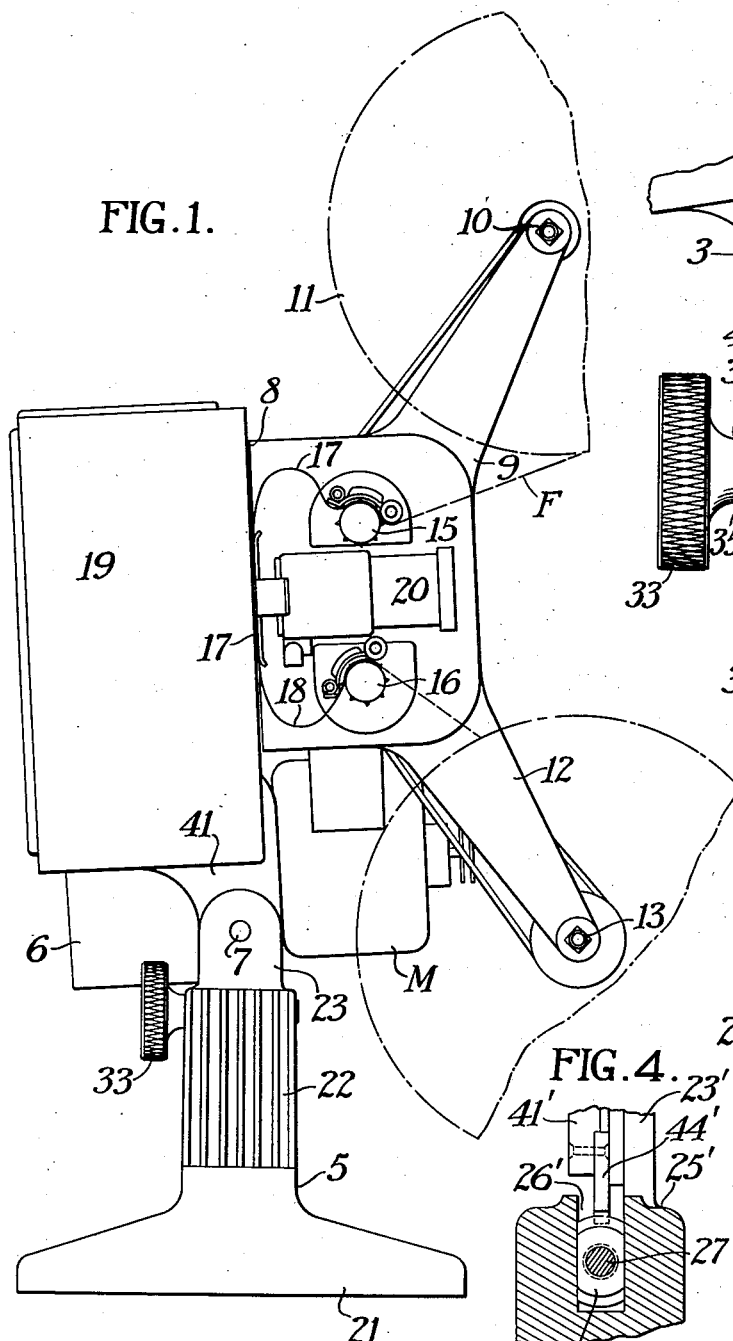
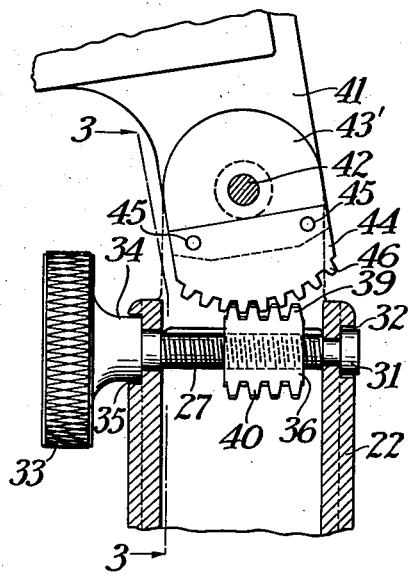
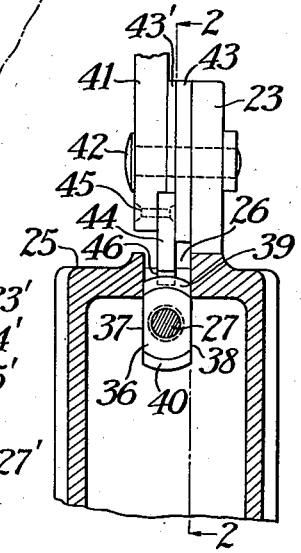
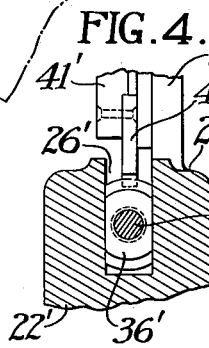
David L. Babcock
INVENTOR.
BY
ATTORNEYS.

Patented Dec. 14, 1937

2,101,830

UNITED STATES PATENT OFFICE 2,101,830

TILTING MECHANISM FOR PROJECTORS

David L. Babcock, Rochester, N. Y., assignor to Eastman Kodak Company, Rochester, N. Y., a corporation of New Jersey Application March 5, 1937, Serial No. 129,259

10 Claims. (Cl. 74—424.8)

This invention relates to photography, and particularly to a tilting mechanism for motion picture apparatus, such as motion picture projectors.

One object of the invention is to provide a tilting mechanism including engaging gear members whereby a positive and smooth movement of the projector relative to the base can be made. Another object is to provide a tilting mechanism including a pair of gear members and a driving screw for one thereof so combined that the projector is held in any adjusted position without benefit of a clamping means. And still another object is to provide a tilting mechanism of the type referred to wherein the parts are so arranged as to give a large mechanical advantage so that the mechanism is actuated with very little effort, and a fine adjustment of tilt can be effected with a fairly rough adjustment of the handwheel. And still another object is to provide a tilting mechanism of the type referred to wherein a large mechanical advantage is obtained without sacrificing in strength of the gear teeth. And yet another object is to provide a tilting mechanism which is so compact as to be adapted to be used in restricted spaces, and one that is simple and cheap to manufacture.

The novel feature that I consider characteristic of my invention is set forth with particularity in the appended claims. The invention itself, however, both as to its organization and its methods of operation, together with additional obects and advantages thereof, will best be understood from the following description of the specific embodiments when read in connection with the accompanying drawing in which, Fig. 1 is a side elevation of a motion picture projector equipped with a tilting mechanism in accordance with and illustrating a preferred embodiment of my invention.

Fig. 2 is an enlarged cross section taken on line 2—2 of Fig. 3,

Fig. 3 is a section taken on line 3—3 of Fig. 2, and

Fig. 4 is a section corresponding to that shown in Fig. 3, but showing a modified form of base member and method of mounting the tilting mechanism therein.

Like reference characters refer to corresponding parts throughout the drawing.

While it is obvious that my invention is suitable for use on any piece of apparatus in which a base supports its mechanism and in which it is desirable to change the inclination of a mechanism relative to said base, my tilting mechanism is particularly designed for use on motion picture projectors.

Referring now particularly to Fig. 1, the projector comprises a base member indicated broadly as 5, and a projector mechanism indicated broadly as 6, which are in themselves separate units being pivoted together at 7 for the purpose hereinafter described.

The projector mechanism 5 includes a housing 8 to which there is an arm 9 attached toward the top of the housing, this arm supporting a shaft 10 adapted to receive a supply reel 11 of film F. There is a lower arm 12 similar to arm 9 in that it carries a shaft 13 adapted to support a take-up reel 14. As is customary, the shaft 13 is driven by power from motor M to wind the film F thereon after it passes over the sprockets 15 and 16 between which the gate 17 is located. The sprockets 15 and 16 move the film to and from loops 17 and 18, and some form of intermittent pull down is employed in the gate 17 for intermittently moving the film past an exposure aperture whereby the image is illuminated by a light beam emanating from the lamphouse 19 to be projected through the objective 20 as is customary with machines of this type. As thus far described, the machine may be of any well-known construction.

Coming now to the invention, the base 5 includes an enlarged pedestal 21 which may be weighted to provide stability, and a vertical supporting member 22 which may be integral with the pedestal, or fastened thereto in any suitable manner, and to the top of which a projector mechanism above described is adapted to be pivoted. As illustrated in Figs. 2 and 3, the supporting member 22 comprises a rectangular hollow member from the top of which extends a post 23 which is located slightly off center with respect to the top wall. This post 23 may be integral with the supporting member 22 as illustrated, or may be fixed thereto in any suitable manner.

The top wall 25 of the supporting member 22 is provided with an elongated slot 26 which communicates with the interior of the hollow supporting member 22. This slot 26 is so located that it cuts across the center of the top wall 25 so that one face of the post 23 forms a continuation of one edge of the slot, see Fig. 3. A driving screw 27 extends through the hollow supporting member 22 in vertical alignment with the slot 26 therein, and has its ends 30 and 31 journaled in the side walls 25 and 26 of the supporting member 22. In order to prevent the driving screw from moving axially of the supporting member, 55 one end thereof is provided with a collar 31 which rests in a recess 32 in the side wall 26, and the other end has a hand wheel 33 fixed thereto, the shoulder 34 of said hand wheel being received in a recess 35 in the side wall 25.

A rack element 36 is in threaded engagement with the driving screw 27 between the side walls 25 and 26. This rack element 36 illustrated constitutes a nut which may be formed economically on a screw machine by boring out and tapping a rod, cutting teeth in the periphery of the rod, and then cutting the rod into sections of the desired length. In order to prevent the rack element from rotating as the driving screw 27 is rotated, the sides of the nut are milled down, as indicated at 37 and 38, until the nut is of a width whereby the tooth portion 39 extends into the slot 26. Therefore, since the nut is thus confined to a sliding movement along the slot 26 as the driving screw is rotated, it constitutes a rack element. The economical method of forming the rack element 36 as above described, explains the presence of the tooth portion 40 on the rack element which has no function whatsoever.

An arm 41 which is integral with or is fixed to the projector mechanism in any suitable manner, is pivoted to the post 23 by a bolt 42, and a pair of spring washers 43 and 43' are interposed between the arms 41 and the post 23 to provide suitable friction in the joint. An arcuate gear segment 44 is fixed to the lower end of the arm 41 by pins 45, and lower end of the segment 44 is adapted to extend into the slot 26 so that the teeth 46 on the periphery thereof engage the tooth portion 39 of the rack element 36. As the driving screw 27 is rotated by means of a hand wheel 33, the rack element 36 will be moved along the slot 26 whereupon the projector mechanism will be tilted relative to the base by virtue of the tooth engagement between the rack element 36 and the gear segment 44. The interengagement of the gear segment 44 and the rack element 36 permits of very strong teeth being used on either part, and this feature is essential in a mechanism of this type since the teeth on the engaging gear elements support the entire weight of the projector mechanism, with the exception of a small amount that is taken up by the friction in the pivoted joint between the arms 41 and the post 23. The friction washers 43 and 43' between the post 23 and the arm 41 serve primarily to take up any back-lash that might occur between the teeth of the gear segment 44 and the rack element 36, but the friction set up in the pivotal joint thereby will have a tendency to relieve the engaging gear teeth of some of the weight of the projector mechanism depending, of course, upon the amount the bolt 42 is tightened.

In Fig. 4 I have illustrated how a solid supporting member can be used in place of the hollow one 22 shown in connection with the preferred embodiments of my invention. The solid supporting member 22' has a recess 26' formed in its top face 25'. Said recess 26' is of such dimensions as to accommodate the driving screw 27' and the rack element 36' which are identical with the ones described above. The recess 26' does not extend clear across the width of the supporting member 22', but leaves bearing portions, not shown, at either end of the recess in which the ends of the driving screw 27' may be journaled and fixed against axial movement relative to the supporting member. The recess 26' therefore in effect provides a narrow channel in the supporting member 22' in which the rack element 36' is confined to travel axially of the driving screw 27', and into which a gear segment 44' fixed to the end of the arm 41' of the projector mechanism which is pivoted to the post 23' extends to engage the rack element 36'.

From the above description it will be readily understood that my novel tilting mechanism provides an arrangement which is cheap to manufacture, easy to assemble, and so compact that it can be used in restricted places, especially places restricted as to width. The arrangement of the gear elements and the means for driving one of them provides a tilting mechanism which has a large mechanical advantage without sacrificing the tooth strength of either of the elements. The arrangement of the gear member and driving screw also provides a self-locking adjustment whereby the projector mechanism is held in any adjusted position without the benefit of a clamping means. It will also be understood that by transmitting power to the gear segment 44 from the driving screw 27 through the rack element 36, a fairly rough adjustment of the hand wheel 33 is required to effect a slight movement of the gear segment 44; a feature which proves advantageous when small degrees of tilt are required in the projector mechanism.

Although I have shown and described certain specific embodiments of my invention, I am fully aware that many modifications thereof are possible. My invention, therefore, is not to be restricted except in so far as is necessitated by the prior art and by the spirit of the appended claims.

Having thus described my invention, what I declare is new and desire to secure by Letters Patent of the United States is:

1. A tilting mechanism comprising a base member, having a channel, a driving screw journaled in said base member, and extending through said channel, a rack member threaded on said driving screw, said rack member engaging the walls of the channel in said base member whereby it is prevented from rotation relative to the base member but is compelled to slide along the driving screw when said screw is rotated, a mechanism to be tilted pivotally mounted on said base member, and an arcuate toothed segment fixed to the pivoted end of the mechanism and extending into the channel to be in engagement with the rack member, whereby a sliding of the rack member relative to the base member effects a tilting of the mechanism relative to the base member.

2. A tilting mechanism comprising a base member, having a channel, a driving screw journaled in said base member and extending through said channel, means for rotating said driving screw, a rack member threaded on said driving screw, said rack member engaging the walls of the channel in said base member whereby it is prevented from rotation relative to the base member but is compelled to slide along the driving screw when said screw is rotated, a mechanism to be tilted pivotally mounted on said base member, and an arcuate toothed segment fixed to the pivoted end of the mechanism and extending into the channel to be in engagement with the rack member, whereby rotation of the driving screw effects a tilting of the mechanism relative to the base member.

3. A tilting mechanism comprising a hollow base member, one wall of said base member having a channel communicating with the interior of the hollow base member, a driving screw extending through said hollow base member in vertical alinement with said channel, the ends of the driving screw being journaled in opposite walls of the base member, a rack member in threaded engagement with said driving screw, means confining the rack member to a sliding movement relative to the driving screw when said screw is rotated, a mechanism to be tilted pivotally mounted on said base member, and an arcuate gear segment fixed to the pivoted end of the mechanism, said arcuate gear segment extending into the channel in the base member to engage the sliding rack member, whereby a sliding of the rack member effects a tilting of the mechanism relative to the base.

4. A tilting mechanism comprising a hollow base member, one wall of said base member having an elongated channel communicating with the interior of the hollow base member, a driving screw extending through said hollow base member and being journaled in the walls thereof, a rack member in threaded engagement with said driving screw, said rack member extending into the channel in said base member whereby it is confined to a sliding movement along the driving screw when said screw is rotated, a mechanism to be tilted pivotally mounted on said base member, and an arcuate toothed segment fixed to the pivoted end of the mechanism, said arcuate toothed segment extending into the channel in the base member to engage the sliding rack member whereby a sliding of the rack member effects a tilting of the mechanism relative to the base member.

5. A tilting mechanism comprising a hollow base member, one wall of said base member having an elongated channel communicating with the interior of the hollow base member, a driving screw extending through said hollow base member and being journaled in the walls thereof, means for rotating said driving screw, a rack member in threaded engagement with said driving screw, said rack member extending into the channel in said base member whereby it is confined to a sliding movement along the driving screw when said screw is rotated, a mechanism to be tilted pivotally mounted on said base member, and an arcuate toothed segment fixed to the pivoted end of the mechanism, said arcuate toothed mechanism extending into the channel in the base member to engage the sliding rack member whereby a sliding of the rack member effects a tilting of the mechanism relative to the base member.

6. A tilting mechanism for a motion picture apparatus comprising a rectangular base member having an elongated slot in the top wall, a driving screw extending through the base member whereby its ends are journaled in the side walls of the base member and its shank intermediate the ends extends through the slot, means for rotating said driving screw, a rack member in threaded engagement with said driving screw and confined by the walls of the slot to a sliding movement relative to the base member when the driving screw is rotated, a motion picture mechanism pivotally mounted to the base member, and an arcuate toothed segment fixed to the pivoted end of the mechanism, said toothed segment extending into the slot in the base member to engage the rack member whereby a sliding of the rack member relative to the base will cause a rotation of the mechanism about its pivot point on the base member.

7. A tilting mechanism for a motion picture apparatus comprising a hollow base member having an elongated slot in one wall extending into the interior of said hollow base member, a driving screw extending through said base member and having its ends journaled in opposite walls of said base member, a rack member in threaded engagement with said driving screw, said rack member having its toothed portion extending into the slot in the base member whereby it is confined to a sliding movement relative to the base member as the driving screw is rotated, a motion picture mechanism pivoted to the base member, and an arcuate toothed segment fixed to the pivoted end of said mechanism and adapted to extend into the slot in the base member to engage the rack member, where a sliding of the rack member will effect a tilting of the mechanism about its pivot relative to the base member.

8. A tilting mechanism for a motion picture apparatus comprising a hollow base member having an elongated slot in one wall extending into the interior of said hollow base member, a driving screw extending through said base member and having its ends journaled in opposite walls of said base member, a nut in threaded engagement with said driving screw, a portion of said nut extending into the slot in the base member whereby it is confined to a sliding movement relative to the base member when the driving screw is rotated, said nut having gear teeth formed on that portion extending into the slot in the base member, a motion picture mechanism pivoted to the base member, an arcuate toothed segment fixed to the pivoted end of said mechanism and adapted to extend into the slot in the base member to engage the teeth on the nut.

9. A tilting mechanism for a motion picture projector comprising a base member including a rectangular hollow vertical support, said vertical support having an elongated slot in the top wall extending into the interior thereof, a driving screw extending through the vertical support in vertical alinement with the slot in the top thereof, and having its ends journaled in the side walls of the support, a hand wheel fixed to one end of the driving screw for rotating the same, a rack element in threaded engagement with said driving screw, said rack element having its toothed portion extending into the slot in the base member whereby it is confined to a sliding movement relative to the base member when the driving screw is operated, an arm extending from a projector mechanism pivotally mounted to the top of the support member, and an arcuate toothed segment carried by said arm and extending into the slot in the top of the support to engage the rack member whereby said arm and mechanism carried thereby is rotated relative to the base member about its pivot point when the driving screw is rotated by means of the hand wheel.

10. A tilting mechanism for a motion picture projector comprising a base member including a vertical supporting member, said supporting member having a recess formed in the top thereof, a driving screw extending through said supporting member so as to pass through the recess therein and having its ends journaled in said supporting member, a hand wheel fixed to one end of said driving screw for rotating the same, a rack member in threaded engagement with that portion of the driving screw passing through the recess in the supporting member, the walls of said recess confining the rack member to a sliding movement relative to the supporting member as the driving screw is rotated, an arm supporting a projector mechanism to be tilted, said arm pivoted to the top of the supporting member, and an arcuate gear segment fixed to the end of said arm and extending into the recess in said supporting member to engage the rack member therein, whereby a tilting of the projector mechanism is effected by rotating the driving screw by means of the hand wheel.

DAVID L. BABCOCK.